US005765721A

United States Patent [19]

Vance

[11] Patent Number: 5,765,721

[45] Date of Patent: Jun. 16, 1998

[54] NOTE PAD SINGLE SHEET DISPENSER

[76] Inventor: Robert L. Vance, 5921 Moon Rock Way, Citrus Heights, Calif. 95621

[21] Appl. No.: 557,410

[22] Filed: Nov. 13, 1995

[51] Int. Cl.$^6$ ..................... B65G 59/00

[52] U.S. Cl. ..................... 221/259; 221/255; 221/188; 221/210; 221/268

[58] Field of Search ..................... 221/188, 210, 221/255, 259, 268, 244, 285

[56] References Cited

U.S. PATENT DOCUMENTS

| | | | |
|---|---|---|---|
| 1,276,493 | 8/1918 | Cooke | 221/258 |
| 2,032,150 | 2/1936 | Richardson . | |
| 2,284,071 | 5/1942 | Sayles . | |
| 2,434,454 | 1/1948 | Breitwieser | 221/244 |
| 3,023,931 | 3/1962 | Carlson | 221/259 |
| 3,375,956 | 4/1968 | Katz | 221/259 |
| 4,401,233 | 8/1983 | Frey . | |
| 4,739,902 | 4/1988 | Joslyn et al. . | |
| 4,781,306 | 11/1988 | Smith . | |
| 5,183,153 | 2/1993 | Linn . | |
| 5,323,918 | 6/1994 | Fair . | |

*Primary Examiner*—William E. Terrell
*Assistant Examiner*—Khoi H. Tran
*Attorney, Agent, or Firm*—Bradley P. Heisler

[57] ABSTRACT

A note pad dispenser arranged to selectively lift a single web of an underlying note pad is provided, with the note pad having a reusable adhesive strip of each leaf of the note pad, with each adhesive strip arranged in a superimposed orientation relative to one another in the stack of leaves of the pad. A base member is arranged with a base member top wall pivotally mounting a platform. The platform is constructed with a platform top wall spaced from a platform bottom wall arranged in a facing relationship relative to the base top wall and pivotally mounted relative thereto. The platform includes an abutment member arranged to accommodate a stack of individual leaves to define a pad, with each of the leaves having an adhesive strip arranged in an aligned relationship relative to one another relative to the pad, with the adhesive strips positioned at a forward end of the pad, and the forward end of the pad in abutment with the abutment member. A finger member is arranged in a spaced relationship relative to the platform to extend over the pad, such that when the pad is pivoted by pivoting of the platform relative to the base member, an uppermost leaf member of the pad engages a roughened surface of the finger to thusly displace the uppermost leaf member relative to the pad, such that pivoting of the platform to a first position from a raised second position displaces the leaf for manual grasping of the leaf and its removal relative to the pad.

19 Claims, 3 Drawing Sheets

NOTE PAD SINGLE SHEET DISPENSER

REFERENCE TO DISCLOSURE DOCUMENT

Applicant hereby references and requests retention of Disclosure Document No. 346,995, received in the P.T.O. on Jan. 31, 1994.

BACKGROUND OF THE INVENTION

1. Field of the Invention

Note taking by individuals in contemporary society has evolved to where individuals require convenient acts as to note pads of various types, wherein note pads having a rectilinear configuration of stacked superimposed sheets are available today with repositionable self-adhesive portions extending along a portion of a bottom surface thereof, with the repositionable adhesive portions super-imposed upon one another to permit individuals to impart notes upon a top surface of each leaf of the aforenoted pad to permit their repositioning upon various support surfaces such as desk tops, refrigerators, and particularly business office documents, files, letters, memos, drafts, reports, etc., or any convenient available support surface for subsequent reference by themselves or other individuals. Such self-adhesive note pads have been heavily adopted in high volume business use applications, where one handed quick access is important. Supports and dispensers for such pads have heretofore been typically limited to cup-like members having a cavity of a complementary configuration and shape for the aforenoted pads, with mechanical dispensers of such pads being of limited effectiveness.

2. Description of the Prior Art

U.S. Pat. No. 4,781,306 issued to Daniel D. Smith sets forth a mechanical dispenser of pads having adhesive, wherein the pad has the adhesive oriented at opposed edges of successive sheets to permit the lifting of an underlying sheet upon removal of an uppermost sheet of the pad. The device embodied in this patent is the only one known to the instant applicant marketed by 3M Company in office supply stores. The mandatory need for the opposed adhesive edge design of the specially made note pads for this device cost approximately 35% more than the standard adhesive edge pads.

U.S. Pat. No. 5,323,918 issued to James C. Fair indicates a mechanical sheet separator wherein the sheets are provided with a pair of low tack repositionable adhesive strips. The relatively complex and automated construction of the Fair patent limits its accommodation for use by individuals in a convenient manner.

U.S. Pat. No. 5,183,153 issued to Richard A. Linn sets forth a memo pad device with the reusable adhesive strip structure, wherein the pad structure is secured within a cavity and a floor of the cavity has a pivotally mounted floor portion, wherein lifting of the free end of the pad relative to a surrounding frame permits access to a single sheet, with the pad to be manually removed.

U.S. Pat. No. 4,739,902 issued to Daniel V. Joslyn sets forth a container for dispensing a stack of web-like members, with a lid of the pad having a depressible hinged top portion including adhesive on its underside to engage a web member from within the container structure associated with that invention.

U.S. Pat. No. 4,401,233 to Joseph V. Frey provides for a dispenser arranged for amounting to an individual's arm portion, with the dispenser having a lever resiliently mounted relative to the receptacle's top wall, with a free end of the lever arranged to engage an underlying sheet member by means of adhesive material on an underside portion of the lever.

U.S. Pat. No. 2,284,071 to S. K. Sayles provides for a sheet separator wherein a suction-type device mounted to a lid portion of a book-like member is arranged to engage a web-like member of a stack attained within the book-like member.

U.S. Pat. No. 2,032,150 to C. Richardson sets forth a means for lifting sheet material from a support or file by utilization of an adhesive member supported by an underside portion of a cover that is hingedly mounted relative to a web stack of material.

While the aforementioned devices set forth representative examples of prior art web dispensers relative to cases and the like, one may be appreciative that the art is relatively crowded with none of the aforementioned devices disclosing the note pad single sheet dispenser arranged for convenient removal of individual webs in a manner as set forth by the invention presented herewithin titled NOTE PAD SINGLE SHEET DISPENSER.

SUMMARY OF THE INVENTION

A note pad dispenser arranged to selectively lift a single web of an underlying note pad is provided, with the note pad having a reusable adhesive strip of each leaf of the note pad, with each adhesive strip arranged in a superimposed orientation relative to one another in the stack of leaves of the pad. A base member is arranged with a base member top wall pivotally mounting a platform. The platform is constructed with a platform top wall spaced from platform bottom wall arranged in a facing relationship relative to the base top wall and pivotally mounted relative thereto. The platform includes an abutment member arranged to accommodate a stack of individual leaves to define a pad, with each of the leaves having an adhesive strip arranged in an aligned relationship relative to one another relative to the pad, with the adhesive strips positioned at a forward end of the pad, and the forward end of the pad in abutment with the abutment member. A finger member is arranged in a spaced relationship relative to the platform to extend over the pad, such that when the pad is pivoted by pivoting of the platform relative to the base member, an uppermost leaf member of the pad engages a roughened surface of the finger to thusly displace the uppermost leaf member relative to the pad, such that pivoting of the platform to a first position from a raised second position displaces the leaf for manual grasping of the leaf and its removal relative to the pad.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive manner, in which there is illustrated and described a preferred embodiment of the invention.

DETAILED DESCRIPTION OF THE PREFERRED EMBODIMENT(S)

Figure 1:
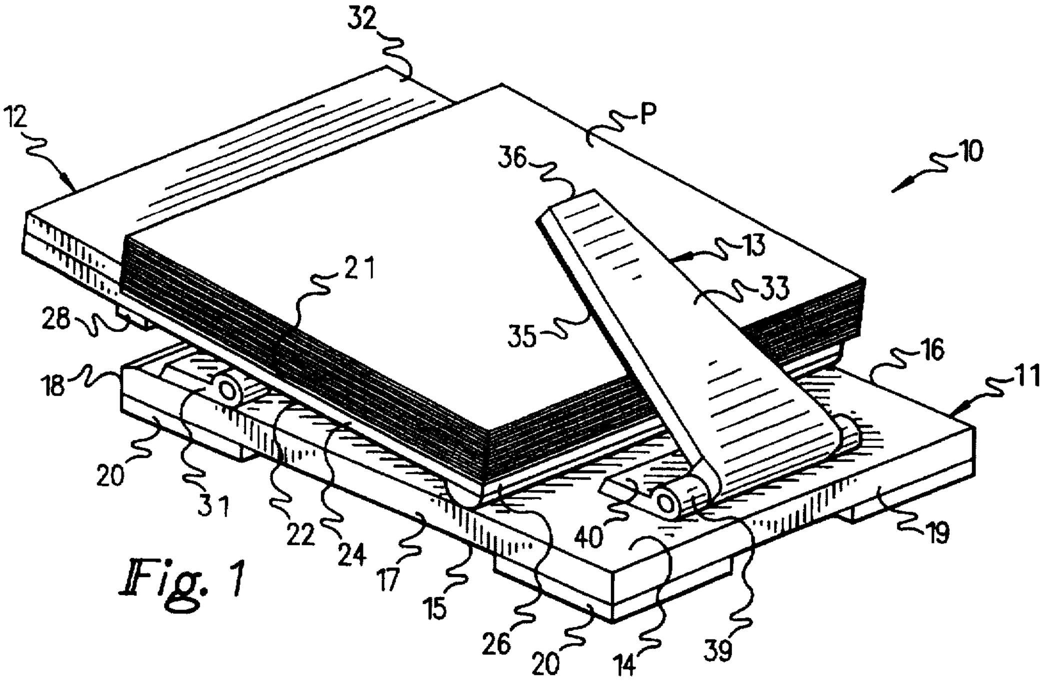
FIG. 1 is a perspective view of the invention in a first position at a forward end of the invention.

Referring now to the drawings, wherein like reference numerals designate corresponding structure throughout the views, and referring in particular to FIGS. 1–7, a note pad single sheet dispenser 10 according to a preferred embodiment of the invention will now be described.

The note pad single sheet dispenser 10 comprises a base member 11 having a platform 12 pivotally mounted to a base top wall 14 cooperating with a pressure finger member 13 to engage a note pad "P", and more particularly a top leaf "L" of a stacked and aligned series of leaves that define the note pad "P".

Figure 2:
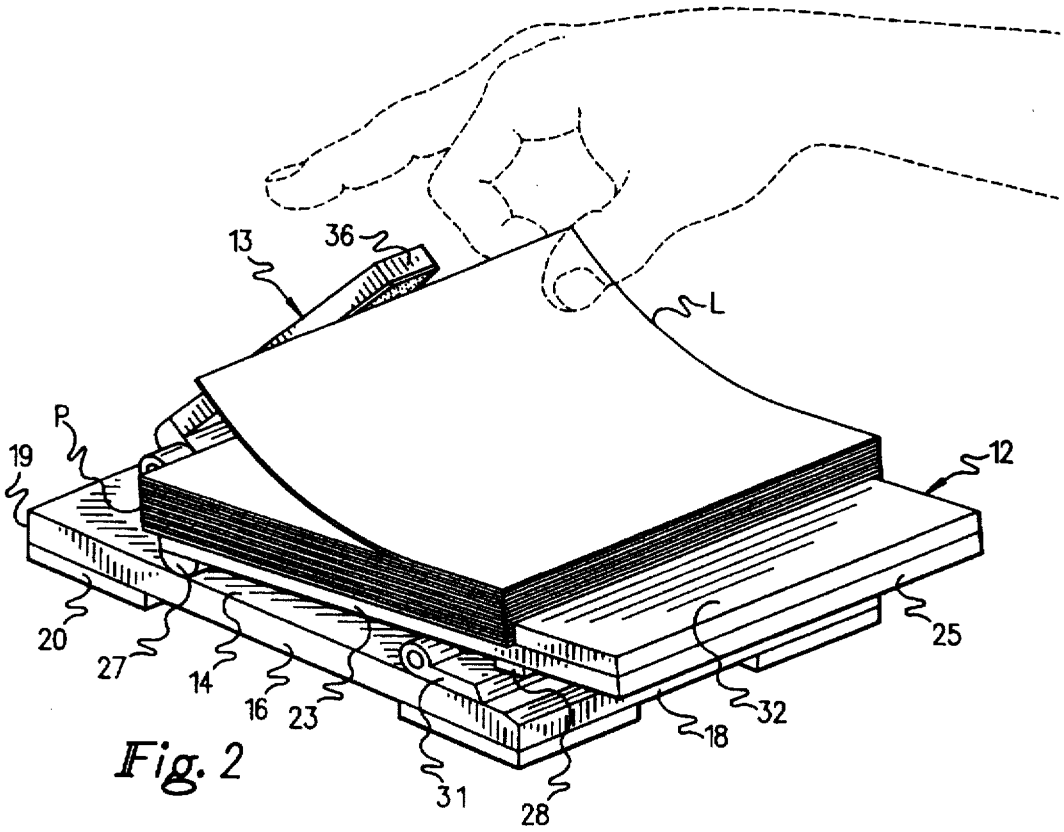
FIG. 2 is a perspective view of the invention in a first position at a rear end view of the invention.

The base member 11 is configured to include the base top wall 14 spaced from a base bottom wall 15 and to further comprise base first and second spaced side walls 16 and 17, as well as base first and second spaced end walls 18 and 19. Optionally secured to the base bottom wall 15 is at least one, typically as illustrated in FIGS. 1 and 2, or a plurality of support feet 20 that may employ for example resilient material or any suitable members to enhance a non-slip engagement of the support feet 20 relative to an underlying support surface (not shown). For example, the entire bottom surface of the base bottom wall 15 may be formed from a resilient material.

Figure 7:
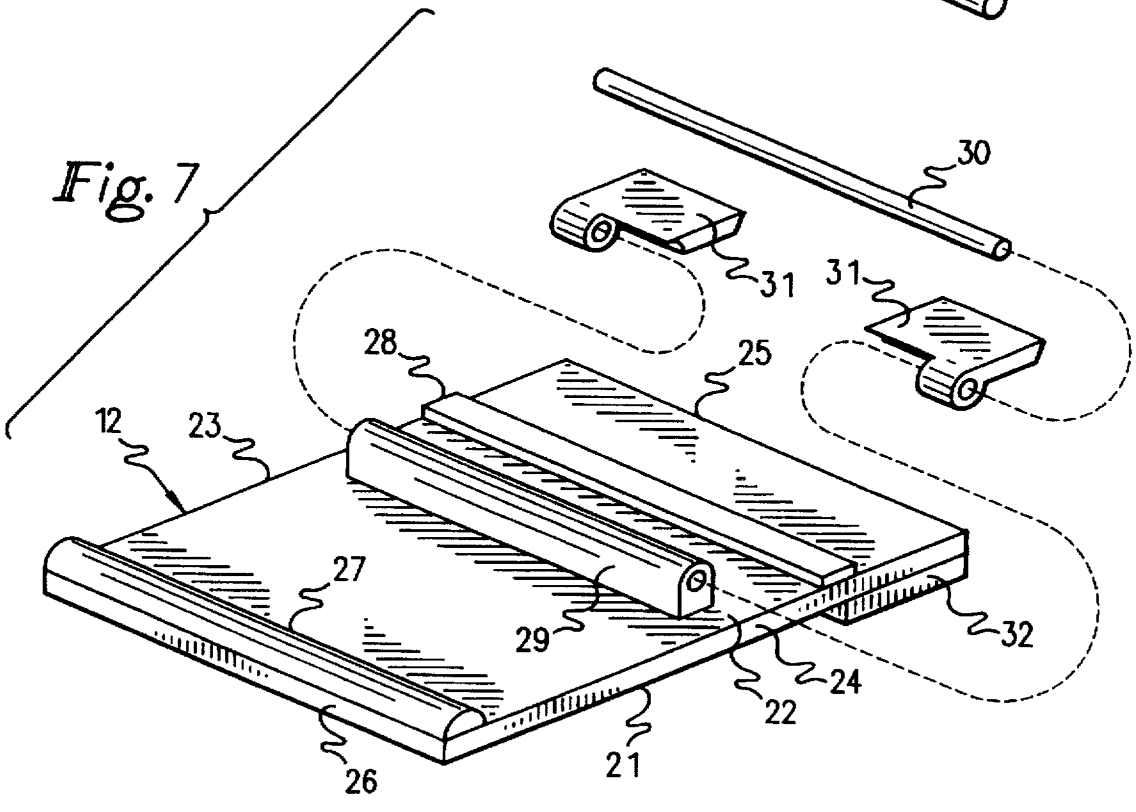
FIG. 7 is a perspective exploded illustration of the platform illustrating the various components and their relationship.

The platform 12, such as illustrated in FIG. 7, includes a platform bottom wall 22 arranged in a facing relationship relative to the base top wall 14. The platform 12 further includes a platform top wall 21 spaced from the platform bottom wall 22, with spaced platform first and second respective side walls 23 and 24, as well as respective first and second end walls 25 and 26. Optionally secured to the platform's bottom wall 22 is a counterweight 27 secured to the platform's bottom wall 22 typically adjacent to the platform second end wall 26, such as illustrated in FIG. 7. An abutment rib 28 oriented between the platform first and second side walls 23 and 24 is arranged to engage the base member 11 to cushion impact of the platform 12 as it is configured to pivot relative to the base member 11, in a manner to be described in more detail below. It is understood that the abutment rib 28 is optionally employed, with other convenient means to be utilized such as springs, hydraulic cushions, and the like, or any suitable mechanical equivalent to the abutment rib 28. The abutment rib 28 serves as a slightly resilient surface to act as a "quiet" stop to eliminate noise from hard surface contact. One suitable material for the abutment rib 28 is a closed cell foam rubber of the type having an adhesive backing and commonly used in weatherstrip applications. Further, the abutment rib 28, as well as the counterweight 27, may be configured and constructed for ease of securement to the platform's bottom wall 22, to include mechanical as well as adhesive type fastening of any known and desired type.

Figure 3:
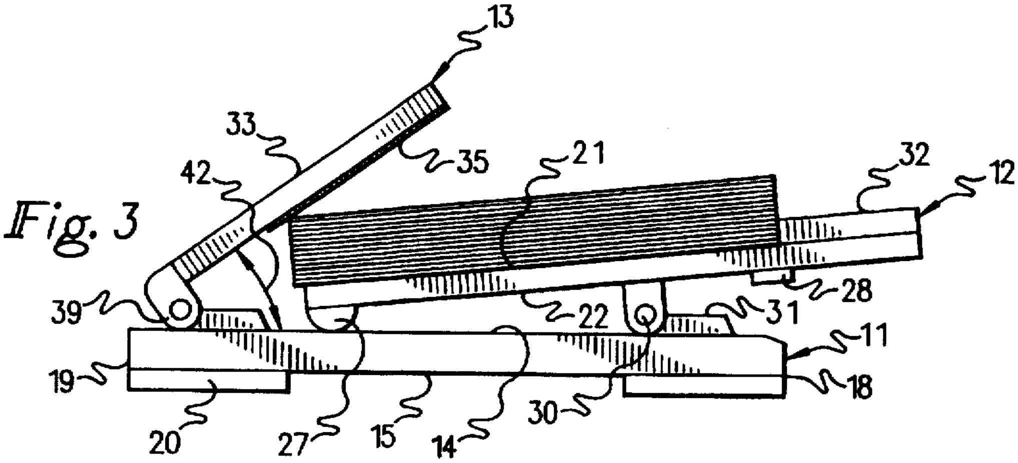
FIG. 3 is a left side elevational view of the dispenser of the invention in a first position.

Reference to FIG. 7 specifically indicates the use of a pivot lug 29 fixedly secured to the platform bottom wall 22 and positioned between the abutment rib 28 and the counterweight 27. Further, the pivot lug 29 is oriented at a greater spacing relative to the platform's second end wall 26 then to the platform first end wall 25 to normally orient and direct the platform to a first position, wherein the platform's second end wall 26 is biased by weight towards the base member's top wall 14 or to a first position, such as illustrated in FIG. 3, wherein the counterweight 27 forms a definite stop limiting further movement of the platform by virtue of abutment with the base top wall 14. Further, a platform axle 30 is directed through the pivot lug 29 and secured at each of the platform axle 30 to an appropriate base axle lug 31 of an illustrated pair of such lugs that are in turn secured to the base member's top wall 14 proximate the base first end wall 18.

An abutment member 32 is mounted onto the platform top wall 21 extending between the platform's first and second side walls 23 and 24 and typically oriented at the platform's first end wall 25 spacing the abutment member 32 relative to the platform's second end wall 26 to accommodate positioning of the note pad "P" onto the platform top wall 21 between the abutment member 32 and the platform second end wall 26. By means of example, the abutment member 32 may be magnetically adhered for the platform to permit positioning of the abutment member 32 and in a manner relative to the platform's first end wall 25 to accommodate pads "P" of various sizes. Alternatively various mechanical fastening structure may be employed to selectively secure the abutment member 32 onto the platform 12.

The pressure finger member 13 is provided with a finger top wall 33 spaced from a finger bottom wall 34, with a roughened engaging surface 35 fixedly secured to the finger's bottom wall 34 extending proximate the finger's first end 36 indicated at the free distal end portion of the finger member 13. A finger pivot lug 37 fixedly secured to the finger member and extending beyond the finger bottom wall 34 receives a finger axle 38 through the pivot lug 37, with typically the finger axle 38 oriented in a parallel relationship relative to the platform axle 30. Finger axle lugs 39 (see FIG. 6) rotatably receive the finger axle 38 to thereby orient and position the pressure finger member 13 between the finger axle lugs 39, with the finger axle lugs 39 secured to a finger lug mount 40, that in turn is secured to the base member top wall 14 adjacent the base second end wall 19, such as illustrated in FIG. 1. The finger bottom wall is oriented at an acute angle 42 (see FIG. 3) relative to the base top wall 14 and is biased in that orientation by an optional spring member 41 indicated as positioned about the finger axle 38 to engage the finger bottom wall 34 between the finger pivot lug 37 and the roughened engaging surface 35. The acute angular orientation of the finger member 13 and its displacement when the platform 12 is pivoted to a second position, such as illustrated in FIG. 4, permits the accommodation of varying height of note pad leaves "L" of the note pad "P".

Figure 4:
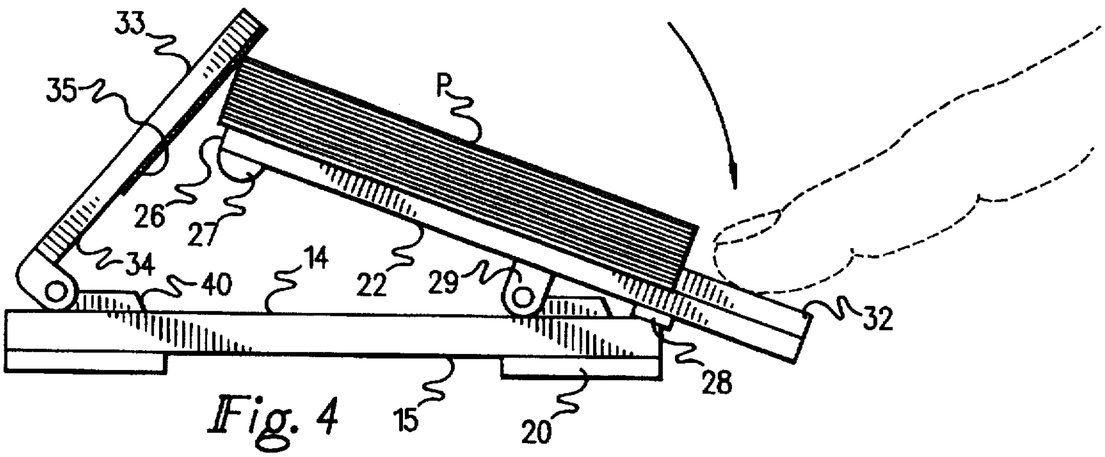
FIG. 4 is a left side elevational view of the dispenser of the invention in a raised second position.
Figure 5:
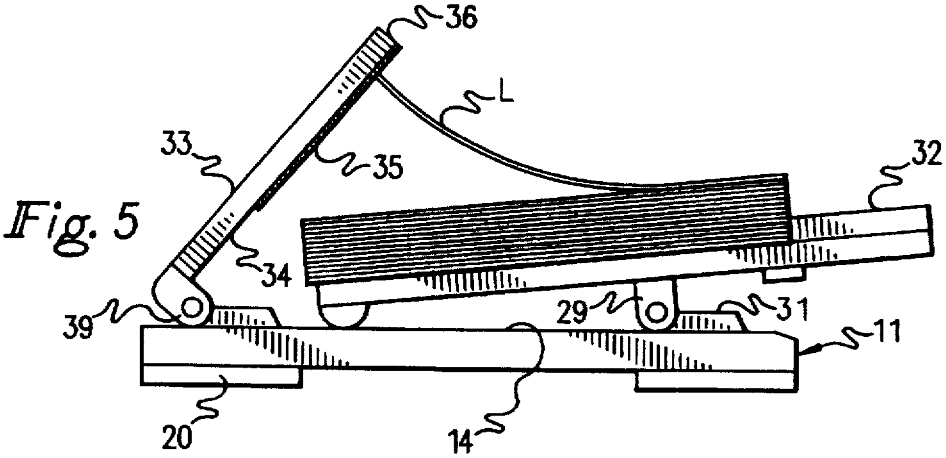
FIG. 5 is a left side elevational view of the invention repositioned to the first aforenoted position, as indicated in FIG. 3, from the second raised position, as indicated in FIG. 4, to engage an uppermost leaf of the pad.
Figure 6:
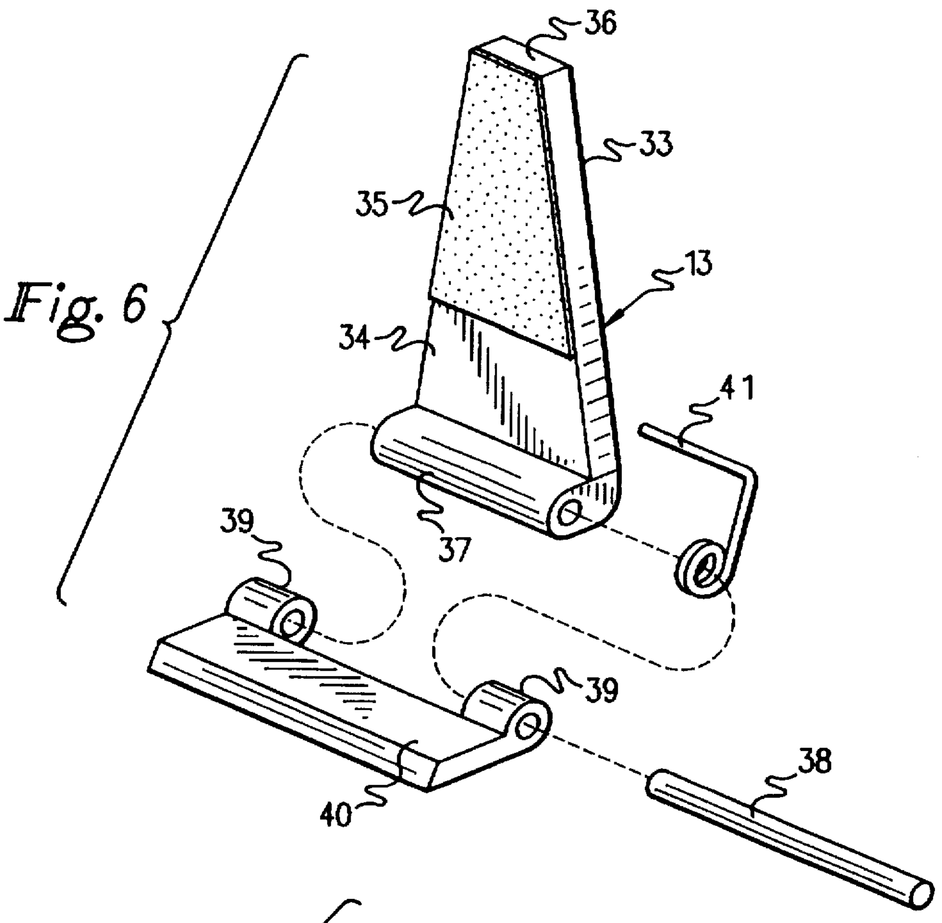
FIG. 6 is an exploded perspective illustration of the finger member illustrating the various parts and relationships.

As indicated in the FIGS. 3–5, when the platform 12 is pivoted about the platform axle 30, the uppermost leaf "L" of the pad "P" engages the roughened engaging surface 35 and upon release of manual pressure from the platform 12, the platform pivots from the second raised position, as illustrated in FIG. 4, to the first position, as illustrated in the FIGS. 3 and 5, where the uppermost leaf "L" is maintained against the roughened engaging surface 35 for ease of manual removal of the uppermost leaf "L" from the pad "P". It is understood that the stack of leaves "L" are of a type commercially available having a reusable adhesive strip portion in an aligned row that is oriented towards the abutment member 32, thereby permitting the leaves "L" to be readily displaced in a manner as illustrated in FIG. 5 but maintained relative to the pad until the uppermost leaf "L" is manually grasped and removed relative to the pad "P" for subsequent use by an individual.

As may be appreciated, the pressure finger member 13 is normally biased towards the platform top wall 21 to maintain the stack in its secured orientation relative to the platform 12, with the finger member 13 pivoted and displaced, as illustrated in FIG. 4, at the second position permitting the engagement of the uppermost leaf "L" to thereby permit an individual to pick up a single sheet at a time utilizing one hand only. Typically the base member 11 is of sufficient weight and mass to provide a solid platform, with the platform having the offset fulcrum arrangement indicated as the pivot lug 29 to allow limited rotary or rocking motion of the platform normally biasing the platform to the first position, as indicated in FIG. 3.

In a variation of the press and release operation, with reference to FIG. 2, when a user pulls the uppermost leaf "L" toward them for removal at the same level as the dispenser, the balance point of the platform coupled with the resistance of the adhesive on the back surface of the leaf being removed, creates enough friction to automatically lift the platform to the second position, after which the platform drops back to the first position ready for removal of the next leaf. This manner of operation creates a single motion remval and reset action if desired.

The roughened engaging surface 35 may be employed of a number 220 grid sandpaper, but other equivalents exist and may be thusly used. The spring member 41 may be provided as a coil, leaf, or of a wire spring material, with any equivalent biasing material employed to bias the pressure finger member 13 towards the platform 12.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A sheet dispenser comprising:

a base member, the base member having a base top wall spaced from a base bottom wall, a base first end spaced from a base second end, and a base first side spaced from a base second side, platform hingedly connected to the base top wall, the platform having support means for supporting a note pad, with the note pad including a plurality of stacked individual leaves, plate-liked pressure means hingedly connected to the base top wall, with the pressure means arranged for engaging an edge of a top sheet of the note pad for manual removal, and the pressure means arranged to extend at least partially over the platform.

2. The dispenser of claim 1 wherein the platform includes a platform first end spaced from a platform second end, and the support means comprises a platform top wall, and a platform bottom wall spaced from the platform top wall.

3. The dispenser of claim 2 wherein the support means further comprises an abutment member secured to the platform adjacent the platform first end.

4. The dispenser of claim 3 wherein the pressure means extends over the platform second end spaced from the abutment member.

5. The dispenser as set forth in claim 3 wherein the abutment member extends above the platform top wall to accommodate the note pad between the abutment member and the platform second end.

6. A dispenser as set forth in claim 3 including a counterweight secured to the platform bottom wall adjacent to the platform second end.

7. A dispenser as set forth in claim 2 including a resilient abutment rib secured to the platform bottom wall, with the abutment rib of resilient construction and extending between the platform first side and the platform second side, and the abutment rib oriented between the platform hinge and the platform first end.

8. The dispenser as set forth in claim 1 wherein the platform includes a platform hinge, wherein the platform hinge is secured to the platform bottom wall adjacent to the platform first end at a first spacing, wherein the platform hinge is spaced from the platform second end a second spacing, and wherein the second spacing is greater than the first spacing.

9. A dispenser of claim 1 wherein the pressure means includes a finger plate, the finger plate having a plate first end spaced from a plate second end, and a plate top wall spaced from a plate bottom wall, with the plate bottom wall arranged in a facing relationship relative to the platform top wall, and the platform bottom wall arranged in a facing relationship relative to the base top wall.

10. The dispenser of claim 9 wherein the plate second end includes a plate hinge, with the plate hinge secured to the base top wall adjacent to the base second end.

11. The dispenser of claim 10 wherein the platform hinge includes a first axle and the plate hinge includes a second axle, with the first axle oriented parallel to the second axle.

12. The dispenser of claim 11 wherein the plate hinge includes spring means for biasing the plate member towards the platform.

13. The dispenser of claim 10 wherein the plate bottom wall includes a roughened surface connected to the plate bottom wall extending between the plate hinge and the plate first end.

14. The dispenser of claim 10 wherein the plate bottom wall is oriented at an acute angle relative to the base top wall.

15. A sheet dispenser having a base member, with the base member including a base member top wall spaced from a base member bottom wall, and the base member having a base member first end spaced from a base member second end, and a platform for supporting a note pad, a platform top wall spaced from a platform bottom wall, and a platform first end spaced from a platform second end, and a platform hinge hingedly connecting the platform to the base member, and the platform hinge secured to the platform bottom wall and to the base member top wall adjacent to the base member first end, and a pressure member having a pressure member top wall and a pressure member bottom wall, and a pressure member first end spaced from a pressure member second end, and a pressure member hinge secured adjacent to the pressure member second end hingedly connecting the pressure member to the base member top wall, and the pressure member hinge oriented adjacent to the platform second end, wherein said pressure member is arranged for engaging an edge of a top sheet of said note pad for manual removal thereof.

16. The dispenser of claim 15 wherein the pressure member bottom wall is arranged in a facing relationship relative to the platform member top wall, and the platform bottom wall arranged in a facing relationship relative to the base member top wall, and the platform hinge spaced from the platform first end a first spacing and spaced from the platform second end a second spacing, with the second spacing greater than the first spacing.

17. The dispenser of claim 16 with the platform having a platform abutment member at the platform first end arranged to accommodate said note pad stack between the abutment member and the platform second end, the pressure member having a roughened surface secured to the pressure member bottom wall arranged to engage an uppermost leaf of the note pad.

18. The dispenser of claim 17 including a counterweight member secured to the platform between the platform second end and the platform hinge to bias the platform second end towards the base member top wall.

19. A sheet dispenser comprising:

a base member, the base member having a base top wall spaced from a base bottom wall, a base first side spaced from a base second side, a base first end spaced from a base second end, and a platform for supporting a note pad, the platform having a platform top wall spaced from a platform bottom wall, a platform first end spaced from a platform second end, and the platform bottom wall including a platform hinge, the platform hinge connected to the platform bottom wall and to the base top wall hingedly mounting the platform to the base member, and the platform hinge spaced from the platform first end a first spacing, and the platform hinge spaced from the platform second end a second spacing, with the second spacing greater than the first spacing, an abutment member secured to the platform adjacent the platform first end, and the abutment member extending beyond the platform top wall to accommodate a note pad between the abutment member and the platform second end, a counterweight secured to the platform bottom wall adjacent to the platform second end to bias the platform second end towards the base top wall, the platform hinge secured to the base top wall adjacent to the base first end, a pressure finger having a finger first end spaced from a finger second end, the finger second end having a finger hinge connected to the base top wall adjacent to the base second end, and the finger having a finger top wall spaced from the finger bottom wall, the finger bottom wall having a roughened surface for retaining an edge of a top sheet of said note pad for manual removal thereof, the finger hinge having biasing means to bias the roughened surface towards the platform second end.

* * * * *